United States Patent [19]

Nagai et al.

[11] Patent Number: 4,775,471

[45] Date of Patent: Oct. 4, 1988

[54] HOLLOW FIBER FILTER DEVICE

[75] Inventors: Hiroshi Nagai; Tadamasa Hayashi, both of Kanagawa, Japan

[73] Assignee: Ebara Corporation, Tokyo, Japan

[21] Appl. No.: 868,050

[22] Filed: May 29, 1986

[30] Foreign Application Priority Data

May 29, 1985 [JP] Japan .................................. 60-114394

[51] Int. Cl.$^4$ ............................................. B01D 23/00
[52] U.S. Cl. ................... 210/323.2; 210/409; 210/500.23; 376/313
[58] Field of Search .................. 210/321.1, 323.2, 340, 210/409, 433.2, 456, 500.23; 376/277, 313

[56] References Cited

U.S. PATENT DOCUMENTS

| 520,293 | 5/1894 | Blackmore | 210/456 |
|---|---|---|---|
| 671,003 | 4/1901 | Ruthenburg | 210/409 |
| 2,570,132 | 10/1951 | Koupal | 210/340 |
| 2,767,851 | 10/1956 | Muller | 210/323.2 |
| 3,419,144 | 12/1968 | Huntington . | |
| 3,442,389 | 5/1969 | Mendelson . | |
| 4,064,052 | 12/1977 | Zimmerly | 210/433.2 |
| 4,352,736 | 10/1982 | Ukai et al. . | |
| 4,540,490 | 9/1985 | Shibata et al. . | |
| 4,610,789 | 9/1986 | Barch | 210/456 |
| 4,622,143 | 11/1986 | Edwards . | |

FOREIGN PATENT DOCUMENTS

| 74210651 | 12/1974 | China . |
|---|---|---|
| WO84/01522 | 4/1984 | European Pat. Off. . |
| 61-57306 | 7/1986 | Japan . |
| 61-149208 | 7/1986 | Japan . |
| 61-171502 | 8/1986 | Japan . |
| 61-192308 | 8/1986 | Japan . |
| 61-197004 | 9/1986 | Japan . |
| 61-197005 | 9/1986 | Japan . |

Primary Examiner—Deborah L. Kyle
Assistant Examiner—Richard W. Wendtland
Attorney, Agent, or Firm—Wenderoth, Lind & Ponack

[57] ABSTRACT

A hollow fiber filter device has a plurality of fiber filter modules suspended therein, the filter module being improved in rigidity and arranged to be easily handled while minimizing the risk of being damaged by securing the opposite ends of hollow fibers of the hollow fiber bundle to two bundle plates and by extending a central pipe from one of the bundle plates through the other of the bundle plates, the module being encased within a protecting hollow cylinder with perforated walls.

9 Claims, 4 Drawing Sheets

… (4,775,471)

HOLLOW FIBER FILTER DEVICE

BACKGROUND OF THE INVENTION

1. Field of Invention

The present invention relates to a filter device and more particularly to a hollow fiber filter device used to filter, for example, return water (condensate recycled) in a nuclear power plant.

2. Description of the Related Art

In the conventional hollow fiber module for use in a filter, a plurality of hollow fibers are formed in a bundle and an upper end of the bundle is secured to a horizontal plate within the filter casing so that each fiber is open at the upper end while being closed at the lower end with a filling material inserted at that end or with two opposite ends thereof being open and positioned at the upper portion in such a manner that the overall configuration thereof is U-shaped. Thus, the construction of such a module has been made by securing one end of the bundle to a solid member while leaving the opposite end free so that the module may be handled by such solid member.

Therefore, such a module consisting of fine fibers having, for example, a small diameter of 0.4–1 mm tends to be rather flexible and easily damaged. Furthermore, it is also easily entangled due to vibration imposed thereon when it is subjected to backwashing which is usually accompanied with air bubbles. Also, it has been noticed in the hollow fiber filter module that filtering through the wall of the hollow fiber has not been uniform on the outside of the bundle and the inside of the bundle, particularly when the diameter of the bundle of hollow fibers is large.

SUMMARY OF THE INVENTION

Accordingly, it is an object of the present invention to provide a hollow fiber filter device which is free from the drawbacks noted above.

The above object is accomplished by the present invention in which a bundle of hollow fibers are secured to upper and lower bundle plates and such an assembly is made more rigid by disposing a pipe centrally within the bundle in such a manner that one end of the pipe is embedded into the upper bundle plate while the other end thereof extends centrally and downwardly through the lower bundle plate and the bundle of fibers is encased within a protecting plastic cylinder having gridwise perforations on the wall thereof to form a hollow filter module. A plurality of such modules are suspended within a filter case to complete the filter device of the present invention.

Further details and advantages of the present invention will be made clear when the detailed description of the preferred embodiment is reviewed referring to the accompanying drawings, a brief explanation of which is summarized below.

DETAILED DESCRIPTION OF THE PREFERRED EMBODIMENTS

Before describing the present invention, some description will be made of the conventional hollow fiber filter module used in a filter device.

Figure 1:
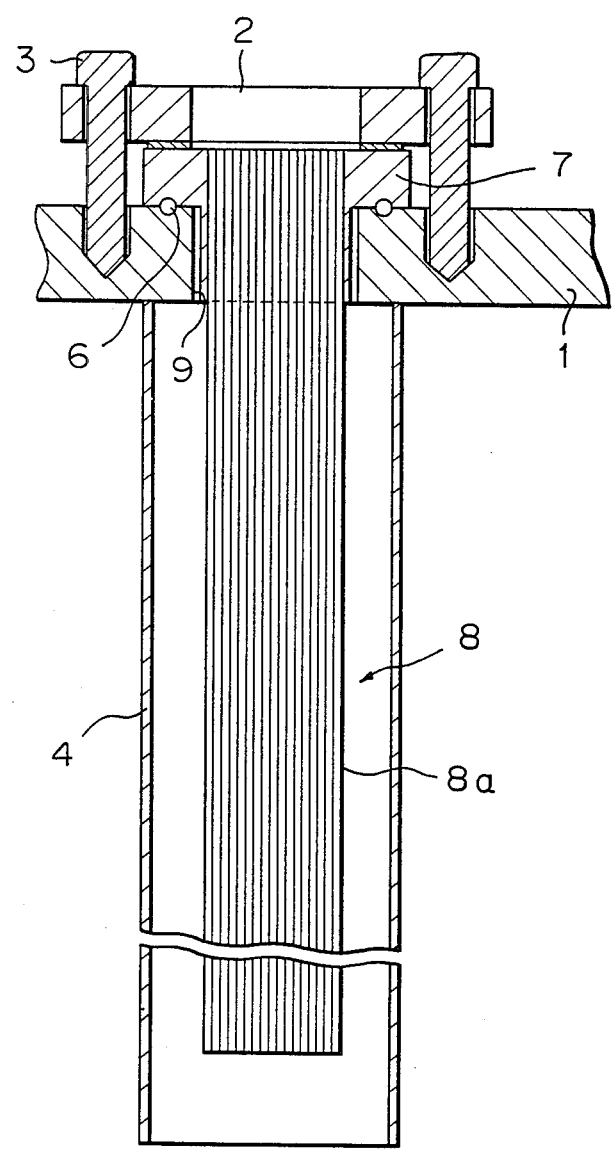
FIG. 1 is an explanatory drawing of a hollow fiber module in cross section which has hitherto been used in a conventional hollow fiber filter device.

Referring to FIG. 1, a conventional module of a hollow fiber used in a filter device is schematically illustrated in which a hollow fiber bundle 8 consisting of a plurality of hollow fibers 8a is secured to a horizontal plate member 1 of a filter casing. The plurality of hollow fibers 8a are formed into a bundle and secured to a bundle plate 7 with each fiber being open at this end and the opposite end being closed by a filler material or by being configured so as to have a U-shape so that each fiber of the bundle is open only at an upper end thereof. The module is thus flexible and consists of the buncdle 8 and the bundle plate 7 which may be handled as a unit by grasping the bundle plate 7. The module is secured to the filter casing by means of the horizontal plate member 1, the bundle 8 being passed downwardly through an opening 9 extending through the plate 1. The module is secured in place by a pressure plate 2 secured or screwed by studs 3 to the horizontal plate member 1 with a seal or "O" ring 6 being interposed therebetween, the pressure plate 2 being provided with an opening which permits passage therethrough of the filtered liquid discharged through the open upper end of the bundle 8.

Since the fine follow fibers 8a are freely suspended from the bundle plate, they are easily damaged during handling and installation or entangled during backwashing with air bubbles while the bundle 8 is surrounded by a protecting hollow cylinder 4 which is open at the bottom. These conditions may cause tearing of fibers at the portions where they are connected to the bundle plate 7. Accordingly, the present invention has been conceived to improve the hollow fiber filter device after taking into consideration the above drawbacks encountered in the prior art.

Figure 2:
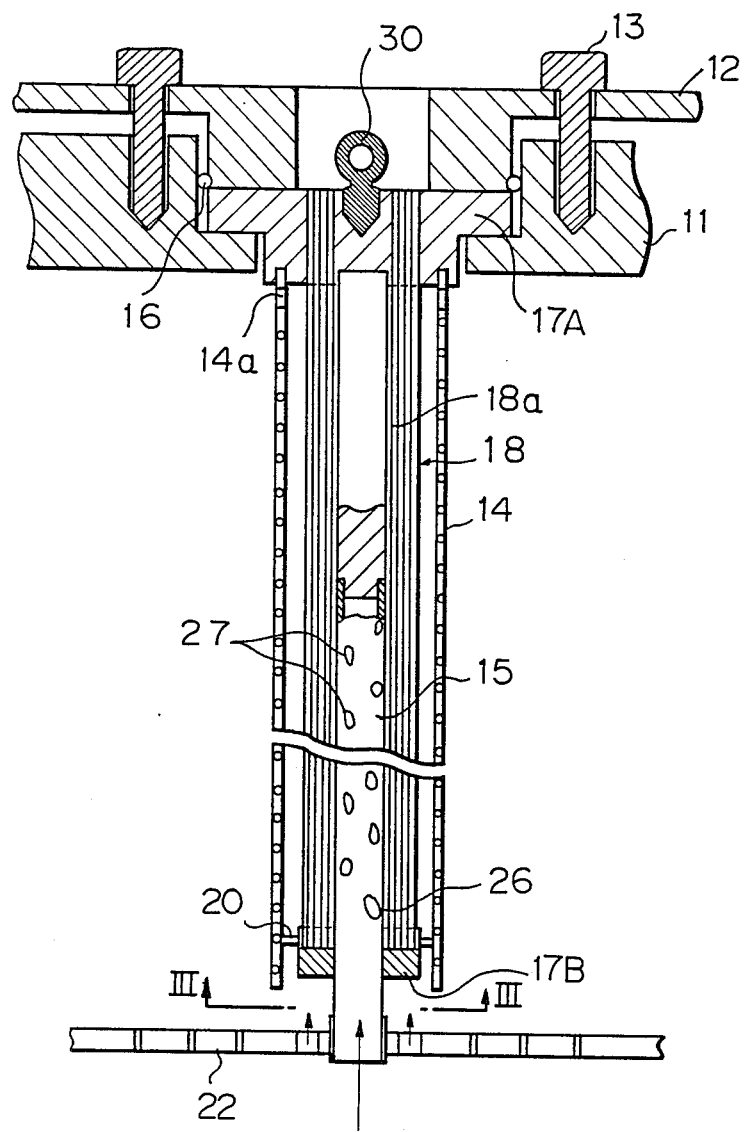
FIG. 2 is a novel fiber module construction according to the present invention and shows its installation mode.
Figure 3:
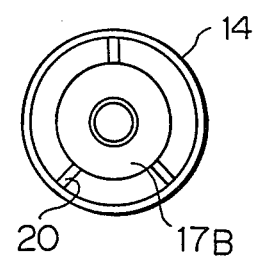
FIG. 3 is a transverse sectional view taken along line III—III in FIG. 2.
Figure 5:
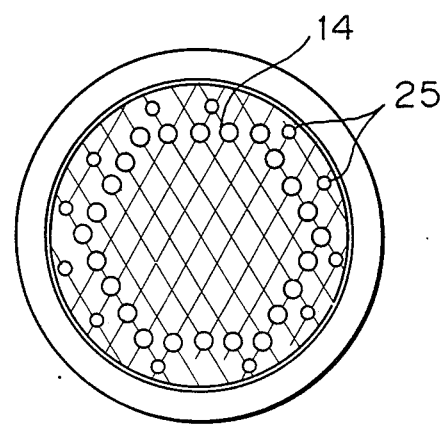
FIG. 5 is a transverse sectional view taken along line V—V in FIG. 4.

Referring now to FIGS. 2 through 5, there is shown a filter device constructed in accordance with the present invention wherein a module having a bundle 18 comprised of a plurality of hollow fibers 18a is installed within a filter casing 21. Each of the fibers 18a is secured by an adhesive at opposite ends thereof to an upper bundle plate 17A and a lower bundle plate 17B, respectively, so that the lower ends of the fibers 18a are sealingly closed and the upper ends of the fibers 18a are open. In order to make the bundle 18 thus secured to the upper and lower bundle plates 17A and 17B rigid in nature, a pipe 15 is centrally disposed within the bundle, the upper end of the pipe 15 is embedded in to the upper bundle plate 17A and the opposite end of the pipe 15 is passed through the lower bundle plate 17B. Securing the bundle 18 to the upper and lower bundle plates 17A and 17B may be accomplished by a molding process and the lower bundle plate 17B may be fixed to the pipe 15 during this molding process. After the opposite ends of the bundle have been secured to the upper and lower bundle plates 17A and 17B, the bundle of fibers is left in a slightly slackened state between the bundle plates 17A and 17B so as to allow vibration of the fibers at the time of backwashing. The lower end of the pipe 15 is open. The bundle 18 is further encased within a protecting hollow cylinder 14 preferably made of a perforated sheet or grid-wise net so as to allow passage of water therethrough. The upper end of the cylinder 14 is secured to the upper bundle plate 17A while the other end of the cylinder 14 may be connected to the lower bundle plate 17B by plural stays 20 as shown in FIG. 3.

The shape and size of the perforations or the mesh of the net which forms the cylinder 14 is preferably selected to be square or circular having edges or a diameter of between 1-5 mm.

It is also preferable to make the cylinder 14 out of a combustible material so that it may be disposed of by incineration.

Figure 4:
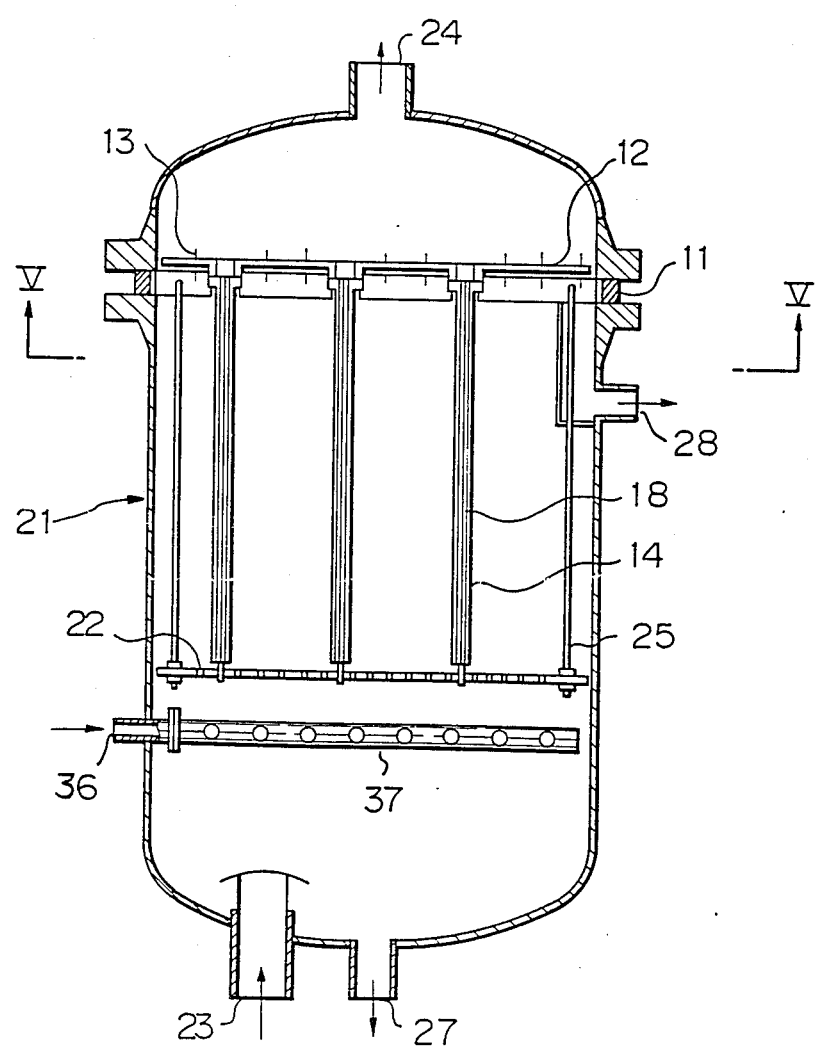
FIG. 4 illustrates the overall construction of the filter device of the present invention in which a plurality of fiber filter modules are suspended.

The module consisting of the upper and lower bundle plates 17A and 17B, bundle 18, pipe 15 and the protecting cylinder 14 may be installed in the casing 21 of the filter device as illustrated in FIGS. 2 and 4. The upper bundle plate 17A is secured to a horizontal plate 11 by a pressure plate 12 with studs 13 located into the plate 11 and a seal or "O" ring 16 interposed therebetween. The lower end of the pipe 15 may be secured to an air distributor panel 22 disposed horizontally in the lower part of the casing 21. With the construction described above, the module is easily installed or dismantled, and the chance of damaging the fine hollow fibers is kept to a minimum by the presence of the protecting cylinder 14 and the upper and lower bundle plates 17A and 17B in addition to the rigidity provided by the combination of the pipe 15 and the bundle plate members 17A and 17B.

The state of the bundle also serves to prevent entanglement of fibers during the operation and backwashing of the bundle. The plurality of modules may be secured in place with the foregoing arrangement. The arrangement may further include several tie rods 25 to stabilize the construction. Also, for easy handling of the module, an eye bolt 30 may be provided on the top of the upper bundle plate 17A.

In the operation of the filter device, the water to be filtered is introduced into the casing 21 from an intake port 23 and the water is filtered by the hollow fibers 18a, the filtered water being discharged out of an outlet port 24 through a space above the horizontal plate 11. When the diameter of the bundle 18 is small such as for example in the range of 20-40 mm, filtration may be effected substantially evenly over the entire surface of the fibers 18a of the bundle 18. However, if the diameter of the bundle 18 is relatively large, say over 40 mm, the filtration rate could become different with respect to the outer and inner portions of the bundle. This may be improved by providing holes 26 and 27 in the pipe 15 so that the water to be filtered is also fed to the bundle from the inside portion of the bundle through the pipe 15, thereby equalizing the filtration rate at the inner and outer portions of the bundle. It will suffice to provide holes 26 and 27 at the lower half of the pipe 15. The pattern and size of the lower holes 26 and the upper holes 27 may also be determined appropriately in consideration of the need to pass air through at the time of backwashing.

During a backwashing operation, air pressure is applied on the surface of the water at the space above the plate 11 so that the cleaned water is forced back through the walls of the hollow fibers to remove solids adhered on the outer surfaces of the fibers.

Also, air is supplied through an air inlet 36 and air is injected into the water through pipes 37. The discharged air produces bubbles which pass upwardly through the air distributor panel 22 into the protecting cylinders 14 and the inside of the pipes 15. The air produces bubbles which cause vibration of the fibers so as to promote separation of adhered solids. In order to most efficiently utilize the air bubbles, it is preferable at the direct them to bottom portion of the bundles 18. To achieve such an end, the distributor panel 22 may be provided with more holes at the portions below the bundles than the remaining portions, for example, more holes in the range of 5-10 mm may be provided in the portions below the bundles 18 and fewer holes in the range of 3-5 mm in the remaining portions. Or alternatively, the holes may be evenly provided in the distributor panel 22 while placing a net having a mesh of, for example, 5-30 mm at the portions where no bundle is present thereabove so that less of air passes through the net upwardly than at the portions where no net is placed due to interfacial tension between air and water.

During backwashing, the air supplied from the air inlet 36 is finally discharged outwardly through an air discharge port 28. Upon completion of the backwashing, the internal liquid or water contaminated with the solids separated from the surface of the fibers is discharged through a waste exhaust port 29.

In the filter device according to the present invention as described above, the chance of damaging the fine hollow fibers is minimized and entanglement of the fibers at the time of backwashing is effectively prevented.

Also, the module of the hollow fibers is easily removable as a whole, and the chance of exposing operators to radioactive rays is minimized in those cases where the filter is used to process waste water in a nuclear power plant.

While the present invention has been explained in detail, further changes and modifications are apparent to those skilled in the art within the scope and spirit of the present invention which is defined in the appended claims.

What is claimed is:

1. A hollow fiber filter device comprising:
a filter casing having an inlet port and an outlet port;
a plurality of filter modules extending vertically within said casing,
each of the modules comprising a bundle of hollow fibers, each of the hollow fibers for filtering liquid passing therethrough from the outside to the inside thereof, filtrate of the liquid adhering to the outside of the fibers, an upper bundle plate to which upper ends of the hollow fibers are secured and are open so as to be able to pass liquid therethrough, a lower bundle plate to which lower ends of the fibers are secured and closed, the fibers extending between said upper bundle plate and said lower bundle plate in a slightly slackened state, a central pipe extending through the center of said bundle of hollow fibers, the central pipe having one end thereof secured to the upper bundle plate and an open portion thereof secured to the lower bundle plate while remaining open so as to be able to pass liquid therethrough, the central pipe having a plurality of holes extending through a part of said open portion that extends through the center of the bundle of hollow fibers, and a protecting hollow cylinder surrounding the bundle of hollow fibers and having a plurality of perforations extending therethrough;

a horizontal member within said casing and above which a space is defined in the casing, said horizontal member having a plurality of openings extending therethrough that are open to said space, each of said filter modules mounted to and suspended vertically from the horizontal member with the upper open ends of the bundle of fibers thereof open to a respective one of said openings;

an air injection means within said casing and below said modules for injecting air bubbles into liquid within the casing; and an air distribution panel between said air injecting means and said plurality of modules for directing said air bubbles injected into the casing at the bottom of the modules suspended from the horizontal member to contact and vibrate the bundles of hollow fibers for removing the filtrate from the outside thereof.

2. A hollow fiber filter device as claimed in claim 1, wherein said open portion of each of said central pipes is also mounted to said air distribution panel, and said air distribution panel has a plurality of perforations extending therethrough in a nonuniform disposition relative to one another which facilitates the direction of the air bubbles toward the bottom of the modules while generally preventing the air bubbles from being directed toward other areas within the casing.

3. A hollow fiber filter device as claimed in claim 1, wherein said protecting hollow cylinder having a plurality of perforations extending therethrough is permeable to the liquid and is substantially impermeable to the air bubbles within the liquid due to interfacial tension between the liquid and air.

4. A hollow fiber filter device as claimed in claims 1, 2 or 3, wherein said protecting hollow cylinder is combustible, an upper end of said cylinder is secured to said upper bundle plate, and a lower end of said cylinder is secured at a part thereof to said lower bundle plate.

5. A hollow fiber filter device as claimed in claims 1, 2 or 3, and further comprising a plurality of rods extending between said horizontal member and said air distributor panel for securing said air distributor panel to said horizontal member.

6. A hollow fiber filter device comprising:

a filter casing having an inlet port and an outlet port;

a plurality of filter modules within the casing, each of the modules comprising a bundle of hollow fibers, each of the hollow fibers for filtering liquid passing therethrough from the outside to the inside thereof, filtrate of the liquid adhering to the outside of the fibers, bundle plate means to which upper and lower ends of the hollow fibers are secured with the upper ends of the fibers being open and the lower ends of the fibers being closed;

an air injecting means within said casing for injecting air bubbles into liquid within the casing; and an air distributor means within the casing for directing at least some of the injected air bubbles against each of the bundles of fibers for vibrating said hollow fibers to remove the filtrate from the outside thereof.

7. A hollow fiber filter device as claimed in claim 6, wherein each of said modules further comprise a protecting hollow cylinder surrounding the bundle of hollow fibers and spaced therefrom for defining a space therebetween, and wherein said air distributor means also directs the air bubbles injected into the casing toward the bottom of said cylinder into said space.

8. A hollow fiber filter device as claimed in claim 6, wherein said cylinder is permeable to liquid and is impermeable to air within the liquid.

9. A hollow fiber filter device as claimed in claim 6, wherein each of said modules further comprises a central pipe extending through a central part of the bundle of hollow fibers to an open bottom end thereof, said central pipe having a plurality of holes extending through at least a part thereof that extends through the center of the bundle, and said air distributor means directs at least some of the injected air bubbles through the bottom end of each of the central pipes so that the air bubbles pass through said holes extending through the central pipe to vibrate said hollow fibers.

* * * * *